United States Patent [19]

Jones

[11] Patent Number: 4,759,116
[45] Date of Patent: Jul. 26, 1988

[54] METHOD OF APPLYING CONTAINMENT SHROUD ON PERMANENT MAGNET ROTORS

[75] Inventor: Donald W. Jones, Burnt Hills, N.Y.

[73] Assignee: General Electric Company, Schenectady, N.Y.

[21] Appl. No.: 548,529

[22] Filed: Nov. 3, 1983

[51] Int. Cl.⁴ ............................................. H02K 15/02
[52] U.S. Cl. ........................................ 29/598; 29/446; 29/736
[58] Field of Search ................ 29/598, 450, 235, 444, 29/732, 736, 446; 310/89

[56] References Cited

U.S. PATENT DOCUMENTS

| | | | |
|---|---|---|---|
| 2,498,357 | 2/1950 | Breisch | 29/450 |
| 2,645,004 | 7/1953 | Dorner | 29/450 |
| 2,721,601 | 10/1955 | Spencer | 29/450 |
| 3,138,859 | 6/1964 | Edwards | 29/450 |
| 3,139,677 | 7/1964 | Goldstein | 29/451 |
| 3,846,901 | 11/1974 | Lovett | 29/235 |
| 4,126,933 | 11/1978 | Anderson et al. | 29/732 |
| 4,296,544 | 10/1981 | Burgmeier et al. | 29/598 |

Primary Examiner—P. W. Echols
Attorney, Agent, or Firm—Marvin Snyder; James C. Davis, Jr.

[57] ABSTRACT

A method of applying a pre-tensioned, metal containment shroud to a rotor of a permanent magnet machine where pressure is applied to the inside of the shroud to stretch it so that the rotor may be inserted. This pressurization can also be used to size the shroud if the yield strength of the containment shroud is exceeded during the stretching process. The containment cylinder is proportioned such that on the removal of the pressure, the cylinder will have the required tension to clamp the permanent magnets to the rotor.

6 Claims, 1 Drawing Sheet

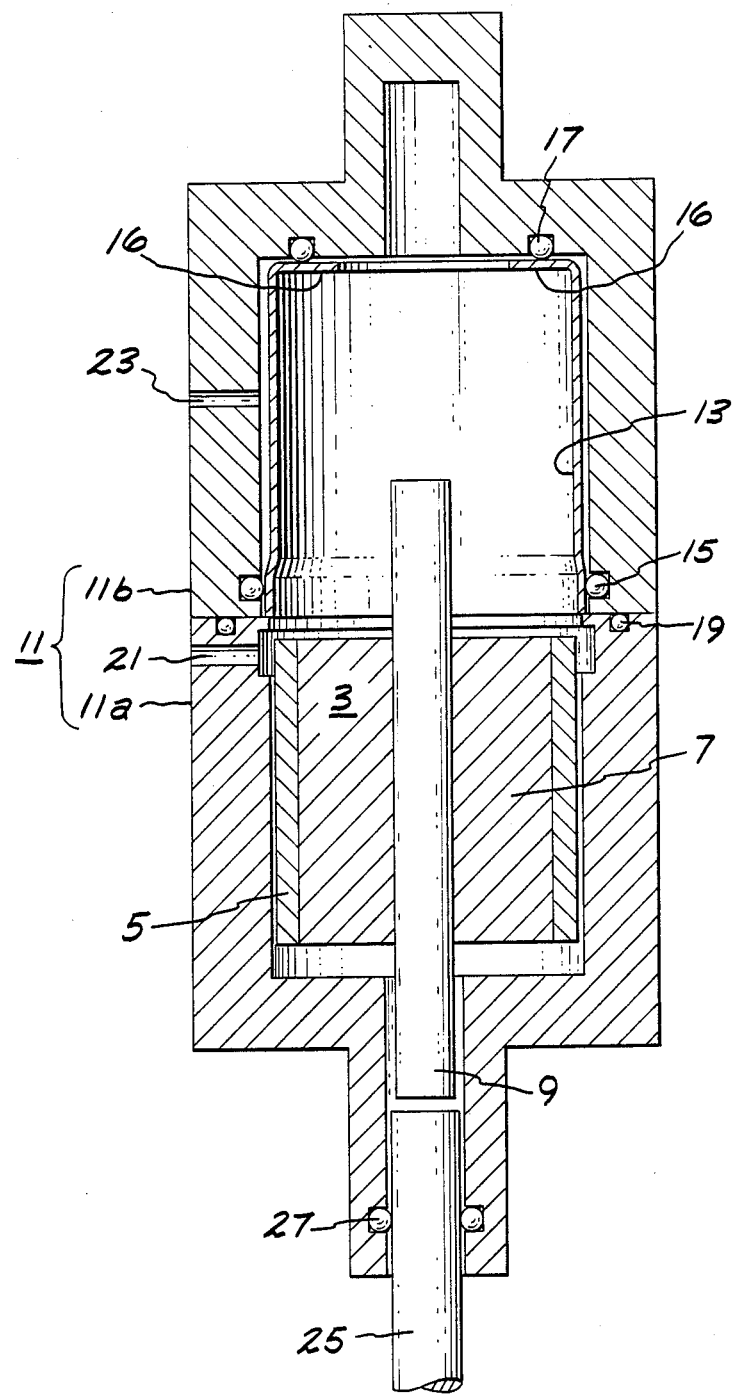

METHOD OF APPLYING CONTAINMENT SHROUD ON PERMANENT MAGNET ROTORS

BACKGROUND OF THE INVENTION

This invention relates to a method of applying a pre-tensioned, metal containment shroud or band by hydraulic or pneumatic means to the rotor of a permanent magnet electrical machine.

In permanent magnet electrical rotating machinery the magnets are frequently positioned in the rotor and held in place against the action of centrifugal force by a band applied over the magnets. The band must have a well controlled residual tension after application in order to prevent radial lift-off of the magnets without exceeding the strength limits of the banding material.

Resin-fiber composite wraps have been used for such bonding with fiberglass or Kevlar ® being the primary strength element and epoxy or polyester resins acting as binders. Some of the problems with this technique are the uncertainty of the residual tension, creep, and temperature limitations of both the fiber and the resin.

Shrunk-on metal shrouds have also been used. They are typically applied to the rotor by heating the metal shroud to a high enough temperature to expand it and provide enough diametral clearance to allow assembly. Too low a temperature rise can cause the shroud to bind on the rotor before the assembly is completed, and too high a temperature can be harmful to the heat treatment of the metal shroud, or can cause demagnetization of the magnets if they have been magnetized. Another problem is that the manufacture of thin walled metal cylinders of the high accuracy required can be expensive.

It is an object of the present invention to assemble metal shrouds onto permanent magnet rotors without heating and with the desired residual stress.

It is a further object of the present invention to produce the final sizing of the retaining shroud before assembly.

SUMMARY OF THE INVENTION

In one aspect of the present invention a method of applying a pre-tensioned containment shroud to the rotor of a permanent magnet electrical machine comprises the steps of placing a shroud having a generally hollow cylindrical shape with an inside diameter less than the outside diameter of the rotor, in one part of a two part chamber. The rotor to be bonded by a shroud is placed in the other part of the chamber. The chamber parts are sealed with the unit chamber walls of both parts forming an enclosed volume. The chamber is then pressurized, forcing the shroud against the chamber wall, expanding the shroud. The rotor is then axially slid from one part of the chamber to the other so that the rotor is positioned inside the expanded shroud. The chamber is then depressurized allowing the shroud to decrease in diameter surrounding the rotor with the desired residual stress.

DETAILED DESCRIPTION OF THE DRAWING

While the specification concludes with claims particularly pointing out and distinctly claiming the present invention, the objects and advantages can be more readily ascertained from the following description of the preferred embodiment when used in conjunction with the accompanying drawing in which:

The FIGURE is a sectional view of a device for applying a containment shroud on a permanent magnet rotor in accordance with the present invention.

DETAILED DESCRIPTION OF THE INVENTION

Referring now to the FIGURE, a rotor 3 to be banded by being enclosed by a shroud is shown as a surface magnet rotor having arcuately shaped surface magnets 5 surrounding a steel core 7 which can be solid or laminated. A shaft 9 extends through the steel core. While a rotor with surface mounted magnets has been shown, a rotor with imbedded permanent magnets having pole pieces at the surface could alternatively be banded in accordance with the invention. A chamber 11 defining a cylindrical cavity is separable into two halves 11a and 11b, respectively. The two halves divide the cylindrical cavity along a radial plane. The rotor is inserted in chamber half 11a. A shroud 13 of high strength and high electrical resisitivity material such as austenitic stainless steel is positioned in chamber half 11b. The shroud has a generally hollow cylindrical shape with an inner diameter less than the outer diameter of rotor 3. The shroud is shown with a flange 16 at one end positioned away from the rotor. The shroud can be formed from a cut-off section of continuous tubing with the flange added. The shroud alternatively can be formed from a drawn cup with the flange formed by punching out the center of the cup bottom.

The shroud is sealed in chamber half 11b by an "O" ring 15 positioned radially at one end of the shroud and another "O" 17 ring adjacent flange 16. Metal-to-metal seals can alternatively be used with the outer surface of the shroud contacting the wall of the chamber to form a seal directly. Chamber halves 11a and 11b, respectively, are sealed by "O" ring 19 therebetween. The chamber halves are held together under pressure by a press (not shown) for example and pressurized through port 21 in chamber half 11a preferably by a gas although a liquid could alternatively be used. The gas pressure forces the shroud against the chamber wall so that trapped fluids are vented through openings 23 in chamber half 11b, one of which is shown in the FIGURE. As used in this description and in the appended claims, the word fluids means liquids and gases. The rotor is then pushed in the axial direction from chamber half 11a to chamber half 11b into the expanded shroud, by a plunger 25 which extends into chamber half 11a and is sealed by "O" ring 27.

The chamber is then depressurized so that the shroud decreases in diameter about the rotor 3 with a residual stress. If the rotor were not inside the shroud, the shroud would attain its original diameter smaller than the rotor.

On removal of the assembled rotor from the chamber, any excess shroud length can be turned or rolled into a flange. This flange and flange 16 can be used to contain balance weight or can be machined to remove weight for final balancing. The flange 16 is not necessary for the operation of the rotor and the "O" ring 17 can be positioned circumferentially against shroud 13 as is "O" ring 15 if the flange 16 were not used.

The bore diameter of chamber 11b can be used to size the shroud if the yield point of the shroud metal is exceeded during pressurization. In that case, the shroud material would stretch and contact the chamber wall. When the pressurization is removed the shroud diameter decreases an amount that if the rotor were not inside the shroud, the shroud would achieve an inside diameter smaller than the outside diameter of the rotor but larger than its original diameter since the yield strength of the material was exceeded. By using the bore diameter of the chamber wall to size the shroud, tolerances of the shroud becomes less critical.

The foregoing describes a method of assembling metal shrouds on permanent magnet rotors without heating and with the desired residual stress. Further the final sizing of the retaining shroud can be produced before assembly.

What is claimed is:

1. A method of applying a pre-tensioned containment shroud of high strength metal to the rotor of a permanent magnet electric machine, comprising the steps of:
    placing said shroud having a generally hollow cylindrical shape with an inside diameter less than the outside diameter of the rotor in one part of a two-part chamber;
    placing the rotor to be bonded by the shroud in the other part of the chamber;
    sealing the chamber parts to one another to form an enclosed volume;
    pressurizing the enclosed volume to force the shroud against the chamber wall by expanding the shroud;
    axially sliding the rotor from said one part of the chamber to the inside of the expanded shroud in the other part; and
    depressurizing the enclosed volume to allow the shroud to decrease in diameter and surround the rotor with the desired stress.

2. The method of claim 1, after the step of pressurizing, further comprising the step of:
    venting trapped fluids between the shroud and chamber wall.

3. The method of claim 1 wherein said shroud comprises austenitic stainless steel.

4. A method of applying a pre-tensioned containment shroud of high strength metal to the rotor of a permanent magnet electrical machine, comprising the steps of:
    placing the shroud having a generally hollow cylindrical shape with an inside diameter less than the outside diameter of the rotor and one part of a chamber having walls defining a cylindrical bore;
    placing the rotor to be bonded by the shroud in the other part of the chamber;
    sealing the chamber parts to one another, the inner chamber walls of both parts forming an enclosed volume;
    sizing the shroud by pressurizing the enclosed volume to force the shroud against the chamber walls exceeding the yield point of the shroud material;
    axially sliding the rotor from said one part of the chamber of the inside of the expanded shroud and the other part; and depressurizing the enclosed volume to allow the shroud to decrease in diameter and surrounding the rotor with desired stress.

5. The method of claim 4 after the step of sizing, further comprising the step of:
    venting trapped fluids between the shroud and the chamber wall.

6. The method of claim 4 wherein said shroud comprises austenitic stainless steel.

* * * * *